United States Patent Office 2,782,507
Patented Feb. 26, 1957

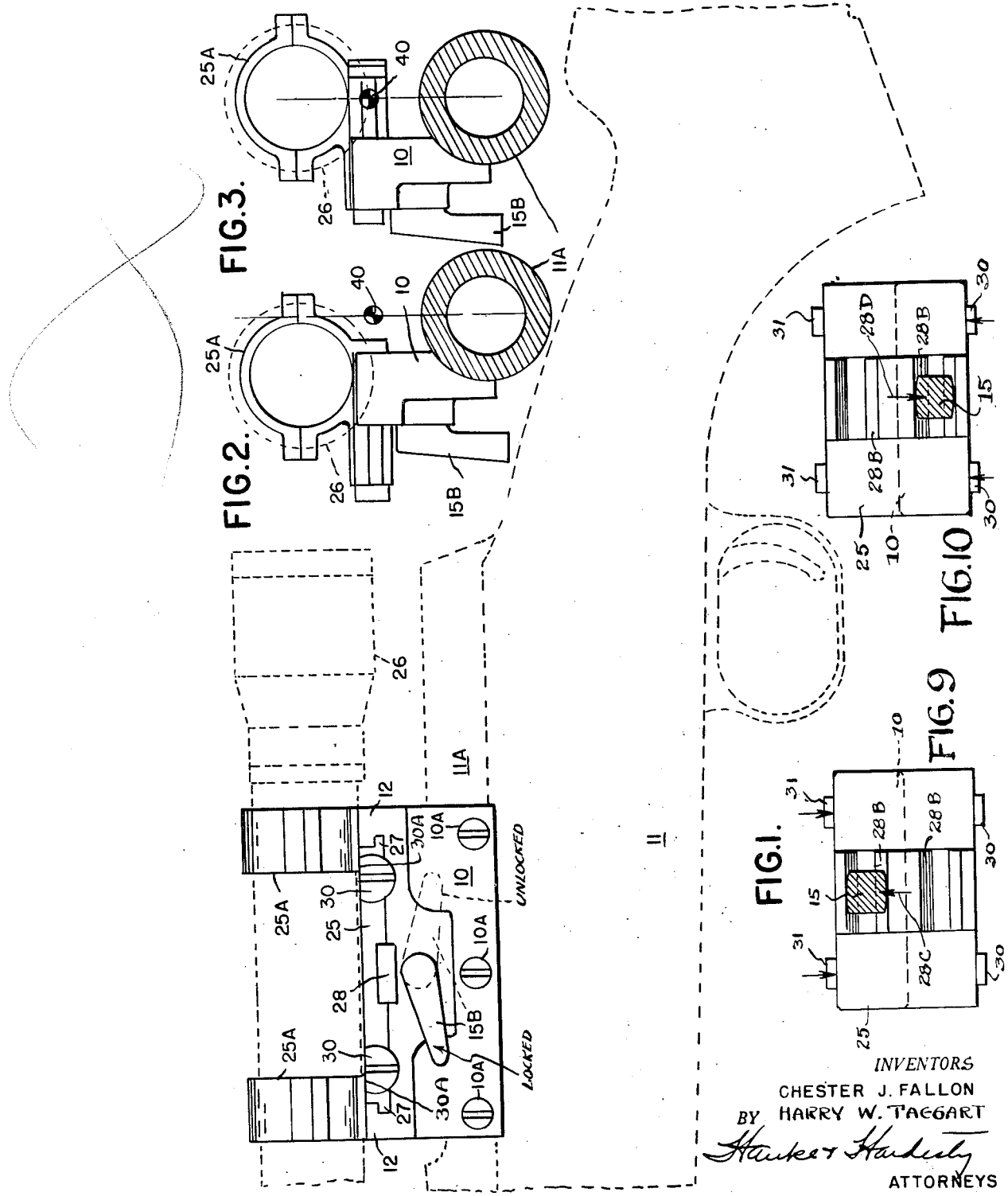

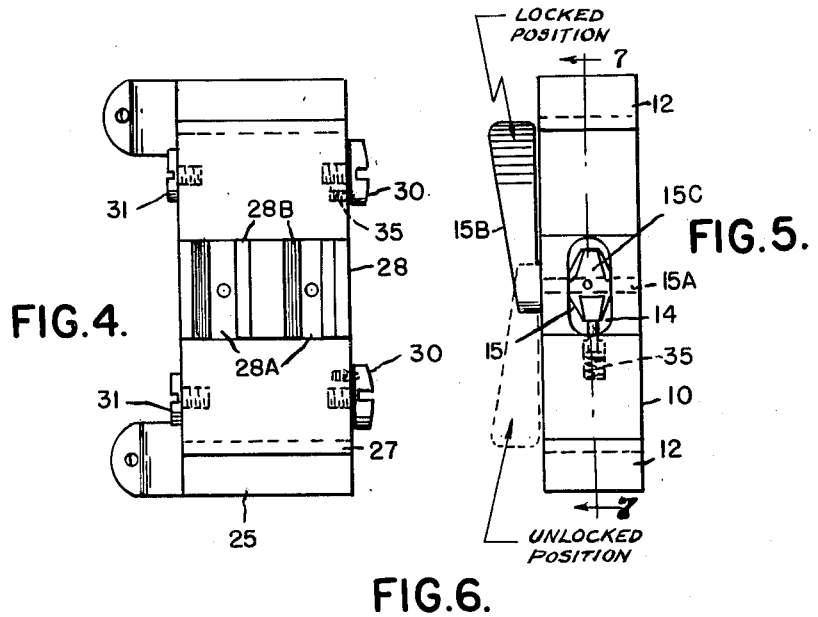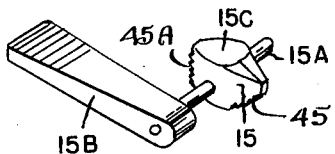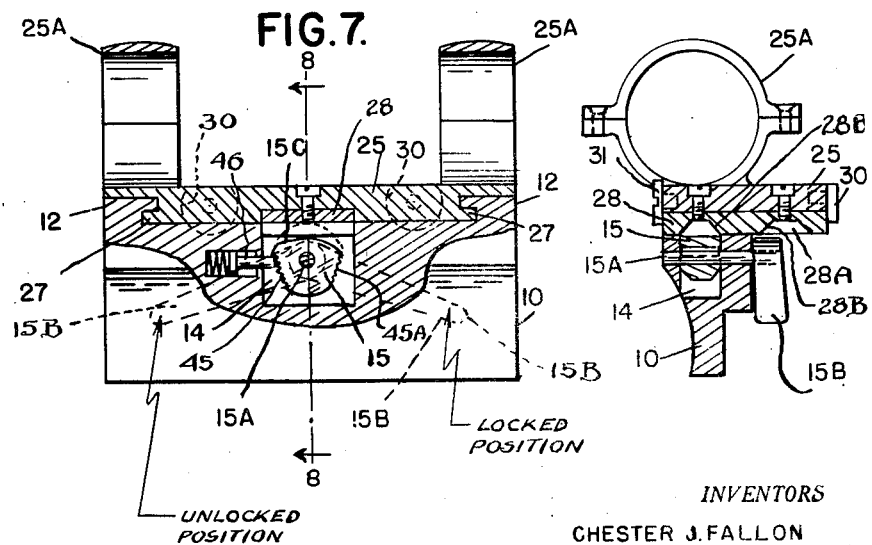

2,782,507

TELESCOPIC GUN SIGHT MOUNTING

Chester J. Fallon and Harry W. Taggart, Detroit, Mich.

Application March 11, 1955, Serial No. 493,791

9 Claims. (Cl. 33—50)

The present invention relates to means for mounting telescope sights on guns.

In telescopic gun sight mounting, the prime object is of course to align the telescope properly relative to the barrel of the gun. However, it is often desirable to move the telescope out of the way to permit the use of the permanent sights, and mounts have been devised to accomplish this purpose but such mounts as heretofore known either required some dismantling of the supports or the moving of the telescope to a position in which the operator can make no possible use of it as an aid in his use of the permanent sights.

Among the objects of the present invention is a telescope mount which provides means by which the telescope may be moved laterally from its aligned position to a parallel position of alignment out of the way of the permanent sights.

Another object is a telescope mount that embodies simple means for locking the telescope accurately in either of two positions in which it is available to the operator.

Another object of the present invention is to facilitate the mounting of the telescopic gun sight, by providing a mount capable of being readily disassembled from the gun.

Still other objects and advantages will be apparent to those skilled in the art upon reference to the following description and the accompanying drawings in which Fig. 1 is a side elevation of the mount showing it in place on a gun.

Fig. 2 is a rear elevation of the mount showing the mount adjusted to one side of the gun sight.

Fig. 3 is a rear elevation of the same, showing the mount adjusted in line with the gun sight.

Fig. 4 is a bottom plan view of the movable member of the mount.

Fig. 5 is a top plan view of the stationary member.

Fig. 6 is a perspective view of the locking element.

Fig. 7 is a view of the mount partly in longitudinal section as if on line 7—7 of Fig. 5, showing the cam in unlocked position.

Fig. 8 is a section on the line 8—8 of Fig. 7, but showing the cam in locked position.

Fig. 9 is a diagrammatic view illustrating the locked position of Fig. 3, and

Fig. 10 is a diagrammatic view illustrating the locked position of Fig. 2.

As shown in the drawings, the mount comprises a base member 10 which by means of screws 10A is fixed to the barrel 11A of a gun 11 in a position in which the side faces are in accurate alignment with the permanent gun sights.

The member 10 is provided on its upper horizontal face at each end with an upwardly extending undercut slide member 12 and midway of its length is provided with a deep recess 14 in which is mounted a locking element, such as is shown in Fig. 6, consisting of a cam member 15 fixed to a shaft 15A rotatable by means of a handle 15B also fixed to the shaft. This element is mounted in the recess 14 with the shaft 15A extending crosswise of the member 10 and at such position that a portion of the cam may extend out of the recess when in suitable rotative position. The cam however is provided with a flat portion 15C so that in another rotative position it is below or at the surface surrounding the recess. Cam 15 is also provided with beveled side faces for a purpose to be later described.

Upon the base member 10 is mounted a second member 25 having upon its upper surface a pair of axially aligned split collars 25A arranged with their common axis longitudinally of the member but to one side of the center line thereof. These collars 25A serve to fix the telescope, indicated at 26, to the member 25. The rectangular plate constituting the member 25 has otherwise a substantially smooth upper surface.

It will be noted that the plate 25 is substantially twice the width of the upper surface of base member 10 but while its width is not critical, it should be of such width as to allow the desired lateral displacement of the telescope.

Plate 25 is provided on its under surface, adjacent its ends, with laterally extending tongues or slide members 27 accurately fitted to the undercut end members 12 of base 10 so as to provide for a smooth lateral relative movement between the two members 10 and 25.

At its middle portion the plate 25 has set into its under surface a narrow plate 28 of hardened steel or other wear resisting metal which extends across the plate 25 and is provided at its under surface with two wide grooves 28A having sloping walls, the width of the grooves and the slope of the walls being such as to loosely fit the shape of the locking cam 15. The inner walls 28B of the two grooves, however, should be accurately spaced from the adjacent longitudinal edge of the plate 25.

In each longitudinal edge of plate 25 there are shown a pair of screws 30—31, these being flat head screws having their underfaces accurately normal to their axes and screws 30 having a portion of the head removed as shown in Fig. 1 at 30A. Screws 31 are preferably not flattened as are screws 30. These screws serve as stops for the plate 25 in its lateral movement. They also serve in conjunction with the cam member 15 and a wall 28b of a groove 28A to positively lock the plate 25 in one of its two lateral positions relative to base 10. The screws 30 and the cam member 15 are shown as being provided with spring detents 35 to prevent undesirable movement when the parts are not properly locked.

As indicated in Fig. 3, the parts are so related that the line of sight along the permanent sights, as indicated by the reference character 40, is directly under the telescope center line, and in the second position, Fig. 2, on a vertical line substantially tangent to the telescope. These two positions enable the user to use the telescope in either position with only a small movement of the head, the actual sight in Fig. 2 being only offset laterally about ¾ inch, telescopic sights such as herein described being used for hunting not target practice. When used for target practice, allowance must be made for this offset adjustment of the telescope.

It is further noted that screws 30 may be rotated, 180 degrees, thus bringing the flattened portions 30A in line with the bottom face of member 25, and when so positioned, it is possible to slide the telescopic mount 25 off of the support 10, thus dismounting the mount from the gun.

Referring more particularly to Figs. 9 and 10, it will be noted that the three-way lock is illustrated. In Fig. 9, illustrating the position of Fig. 3, the cam 15 is engaged in groove 28, the side of the cam engaging the side 28B of said groove and the mount 25 is thus locked and fixed by screws 31 and cam face 28B as at 28C, and thereby the gun sight is accurately lined up in line with the gun sight. In Fig. 10 the cam has been released to permit the mount 25 to be laterally shifted to the position shown in Fig. 2 and then rotated to locked position to engage side 28B of the other groove 28 as at 28D and thus the screws 30 are brought into play engaging the other parallel side of the support 10, the mount 25 being locked or fixed in position by screws 30 and cam face 28B of said other groove, a similar three-way locking arrangement.

It is further noted that the cam 15 is provided with roughened or serrated surface 45 and 45A adapted to be respectively engaged by a spring pressed pawl 46 to secure the cam 15 in its "unlocked" or "locked" position, Fig. 7 showing the pawl 46 engaged with serrated cam face 45.

We claim:

1. A telescopic gun sight mount comprising a base member adapted to be fixed to the gun, a laterally slidable member mounted upon said base member and provided with means for securing a telescope thereto, said slidable member being of greater width than said base member and carrying a pair of stops on each edge thereof arranged to coact with the edges of said base member to limit the sliding movement, and means carried by said base member for locking one pair of stops against said base member.

2. A telescopic gun sight mount comprising a base member adapted to be fixed to the gun, a laterally slidable member mounted upon said base member and provided with means for securing a telescope thereto, said slidable member being of greater width than said base member and carrying a pair of stops on each edge thereof arranged to coact with the edges of said base member to limit the sliding movement, and means carried by said base member for locking one pair of stops against said base member, said locking means comprising a rotatable cam member adapted to contact a portion of said slidable member and a handle providing for such rotation.

3. In mounting means for a telescopic gun-sight, a base member adapted to be fixed to the gun and provided with accurately parallel longitudinal edges, said member being provided near its ends with transversely arranged slides, an upper member of greater width than the base member mounted thereon and provided with slides coacting with those on said base member, said upper member also having its longitudinal edges accurately parallel, stop members at the edges of said upper member and adapted to coact with the edges of the base member to limit the movement of the upper member in its lateral movement, means carried by the upper member for fixing a telescope thereto, and coacting means carried by the two members for fixing the stops against the base member upon either edge.

4. A telescopic gun sight assembly comprising a base member adapted to be fixed to the gun, a laterally slidable member mounted upon said base member and providing a mount to which a telescope is secured, said slidable member carrying a pair of longitudinally spaced stops disposed in accurate parallel relation with the axis of the telescope and further provided with a cam face laterally spaced from said stops and located intermediate thereof, a cam carried by said base member, said base member having a machined side face extending accurately parallel with respect to the axis of the gun sights, said cam actuated to engage the cam face of said mount to draw said stops against the side face of the base member and to lock the mount in accurate parallel relation with respect to the gun sights.

5. A telescopic gun sight assembly comprising a base member adapted to be secured to the gun, a telescope mount laterally slidably supported by said base member and provided with means for securing the telescope thereto, said base having a pair of parallel side faces machined in parallel with respect to the gun sights, said mount having laterally spaced pairs of stops, each pair of stops located in a common plane accurately aligned in parallel with respect to the telescope axis, said pairs of stops laterally spaced a distance greater than the spacing of the side faces of said base member, and means selectively locating and locking said mount to said base with either pair of said stops in contacting relation respectively with one or the other of the side faces of said base member, whereby to align said telescope with said gun sights or in lateral offset parallel relation therewith.

6. A telescopic gun sight assembly comprising a base member adapted to be secured to the gun, a telescope mount laterally slidably supported by said base member and provided with means for securing the telescope thereto, said base having a pair of parallel side faces machined in parallel with respect to the gun sights, said mount having laterally spaced pairs of stops, each pair of stops located in a common plane accurately aligned in parallel with respect to the telescope axis, said pairs of stops laterally spaced a distance greater than the spacing of the side faces of said base member, a cam carried by said base member, and a pair of laterally spaced cam grooves carried by said mount and extending longitudinally thereof, said cam operable to selectively engage either of said laterally spaced cam grooves whereby to locate and lock said mount to said base with either pair of said stops in contacting relation respectively with one or the other of the side faces of said base member and to thereby align said telescope with the said gun sights or in lateral offset parallel relation therewith.

7. A telescopic gun sight mount comprising a base member adapted to be secured to the gun, an upper member laterally slidably engaged with said base member, said upper member provided with means for securing a telescopic gun sight thereto and having stops coacting with said base member to limit the lateral movement of said upper member, and means selectively laterally urging said stops against said base member to lock said upper member in a predetermined position relative to said base member.

8. A telescopic gun sight mount comprising a base member adapted to be secured to the gun, an upper member laterally slidably engaged with said base member, said upper member provided with means for securing a telescopic gun sight thereto and having stops coacting with said base member to limit the lateral movement of said upper member, and means selectively laterally urging said stops against said base member to lock said upper member in a predetermined position relative to said base member, said last mentioned means comprising an adjustable cam element carried by said base member and operable to engage with said upper member to laterally urge said stops against said base member.

9. A telescopic gun sight mount comprising a base member adapted to be secured to the gun, an upper member laterally slidably engaged with said base member, said upper member provided with means for securing a telescopic gun sight thereto and having stops coacting with said base member to limit the lateral movement of said upper member, said base member having a recess, said upper member having a groove on the side adjacent said base member and disposed normal to the line of lateral movement of said upper member, an adjustable cam element carried in said recess of said base member, said cam element selectively engageable in said groove and operable to exert lateral pressure on said upper member to laterally urge said stops into a locked position against said base member.

References Cited in the file of this patent

UNITED STATES PATENTS 2,407,977    English _____ Sept. 24, 1946